United States Patent
Suehiro et al.

(10) Patent No.: US 10,886,545 B2
(45) Date of Patent: Jan. 5, 2021

(54) FUEL CELL MODULE AND FUEL CELL APPARATUS

(71) Applicant: KYOCERA CORPORATION, Kyoto (JP)

(72) Inventors: Masanori Suehiro, Kusatsu (JP); Eizo Matsui, Kizugawa (JP); Tomoyuki Oda, Kyoto (JP)

(73) Assignee: KYOCERA Corporation, Kyoto (JP)

( * ) Notice: Subject to any disclaimer, the term of this patent is extended or adjusted under 35 U.S.C. 154(b) by 8 days.

(21) Appl. No.: 15/755,597

(22) PCT Filed: Aug. 29, 2016

(86) PCT No.: PCT/JP2016/075249
§ 371 (c)(1),
(2) Date: Feb. 27, 2018

(87) PCT Pub. No.: WO2017/038782
PCT Pub. Date: Mar. 9, 2017

(65) Prior Publication Data
US 2019/0027764 A1    Jan. 24, 2019

(30) Foreign Application Priority Data
Aug. 31, 2015  (JP) ................................. 2015-170127

(51) Int. Cl.
*H01M 8/249* (2016.01)
*H01M 8/2475* (2016.01)
(Continued)

(52) U.S. Cl.
CPC .......... *H01M 8/04067* (2013.01); *C25B 1/04* (2013.01); *C25B 9/00* (2013.01); *C25B 9/18* (2013.01);
(Continued)

(58) Field of Classification Search
None
See application file for complete search history.

(56) References Cited

U.S. PATENT DOCUMENTS

2009/0148733 A1* 6/2009 Tsunoda ............ H01M 8/04276
429/411
2010/0119906 A1* 5/2010 Ono ................... H01M 8/04007
429/434
(Continued)

FOREIGN PATENT DOCUMENTS

EP    2624352 A1    8/2013
JP    2007-59377 A    3/2007
(Continued)

OTHER PUBLICATIONS

International Search Report received for International Application No. PCT/JP2016/075249 dated Nov. 15, 2016, 2 pages.

*Primary Examiner* — Ula C Ruddock
*Assistant Examiner* — Amanda Rosenbaum
(74) *Attorney, Agent, or Firm* — Viering, Jentschura & Partner MBB

(57) ABSTRACT

A fuel cell module includes: a housing; a cell stack; a reformer; and an oxygen-containing gas supply section. The cell stack comprises fuel cells which are arranged along a predetermined arrangement direction, and is housed in the housing. The reformer is disposed above the cell stack in the housing. The oxygen-containing gas supply section is disposed along the predetermined arrangement direction of the fuel cells so as to face the cell stack and the reformer, and has a gas flow channel through which an oxygen-containing gas to be supplied to the fuel cell flows downwardly. Moreover, in the oxygen-containing gas supply section, the gas flow channel has a first region and a second region which is greater than the first region in flow channel width in a direction perpendicular to a direction in which an oxygen- (Continued)

containing gas flows, and the predetermined arrangement direction of the fuel cells.

6 Claims, 10 Drawing Sheets

(51) Int. Cl.
| | |
|---|---|
| H01M 8/243 | (2016.01) |
| H01M 8/2428 | (2016.01) |
| H01M 8/124 | (2016.01) |
| H01M 8/12 | (2016.01) |
| H01M 8/0612 | (2016.01) |
| H01M 8/0606 | (2016.01) |
| H01M 8/04089 | (2016.01) |
| H01M 8/04082 | (2016.01) |
| H01M 8/04007 | (2016.01) |
| C25B 9/18 | (2006.01) |
| C25B 9/00 | (2006.01) |
| C01B 3/38 | (2006.01) |
| C25B 1/04 | (2006.01) |

(52) U.S. Cl.
CPC ... *H01M 8/04089* (2013.01); *H01M 8/04201* (2013.01); *H01M 8/0606* (2013.01); *H01M 8/0625* (2013.01); *H01M 8/2428* (2016.02); *H01M 8/2475* (2013.01); *C01B 3/38* (2013.01); *H01M 8/12* (2013.01); *H01M 8/243* (2013.01); *H01M 8/249* (2013.01); *H01M 2008/1293* (2013.01)

(56) References Cited

U.S. PATENT DOCUMENTS

| | | |
|---|---|---|
| 2010/0167154 A1 | 7/2010 | Ono |
| 2012/0251905 A1 | 10/2012 | Izawa et al. |
| 2014/0120382 A1 | 5/2014 | Taniguchi |
| 2017/0350025 A1 | 12/2017 | Oda et al. |

FOREIGN PATENT DOCUMENTS

| | | | | |
|---|---|---|---|---|
| JP | 2013-157271 A | | 8/2013 | |
| JP | 2015-138580 A | | 7/2015 | |
| JP | 2015138580 A | * | 7/2015 | |
| WO | WO-2011077256 A1 | * | 6/2011 | .......... H01M 8/2457 |
| WO | 2016104361 A1 | | 6/2016 | |

* cited by examiner

US 10,886,545 B2

FUEL CELL MODULE AND FUEL CELL APPARATUS

RELATED APPLICATIONS

The present application is a national stage entry according to 35 U.S.C. § 371 of PCT application No. PCT/JP2016/075249 filed on Aug. 29, 2016, which claims priority from Japanese application No. 2015-170127 filed on Aug. 31, 2015 and is incorporated herein by reference in its entirety.

TECHNICAL FIELD

The present invention relates to a fuel cell module and a fuel cell apparatus.

BACKGROUND ART

In recent years, as next-generation energy sources, there have been proposed various fuel cell modules of the type constructed by placing, in a housing, a cell stack device comprising a cell stack composed of an array of a plurality of fuel cells known as one kind of cells (refer to Patent Literature 1, for example).

In the above-described housing, there are provided a reformer which generates a fuel gas which is supplied to the fuel cell, a flow channel for supplying an oxygen-containing gas to the fuel cell, and a flow channel for discharging an exhaust gas emitted from the fuel cell out of the housing.

CITATION LIST

Patent Literature

Patent Literature 1: Japanese Unexamined Patent Publication JP-A 2007-59377

SUMMARY OF INVENTION

A fuel cell module according to a present disclosure comprises: a housing; a cell stack; a reformer; and an oxygen-containing gas supply section. The cell stack is housed in the housing, and comprises a plurality of fuel cells which each have a columnar shape and are arranged along a predetermined arrangement direction. The reformer is disposed above the cell stack in the housing, and generates a fuel gas which is supplied to the fuel cells. The oxygen-containing gas supply section is disposed along the predetermined arrangement direction of the fuel cells so as to face the cell stack and the reformer, and has a gas flow channel through which an oxygen-containing gas to be supplied to the fuel cell flows downwardly. Moreover, in the oxygen-containing gas supply section, the gas flow channel has a first region and a second region which is greater than the first region in flow channel width in a direction perpendicular to a direction in which an oxygen-containing gas flows, and the predetermined arrangement direction of the fuel cells.

A fuel cell apparatus according to the present disclosure comprises: the fuel cell module described above; and an exterior case which houses therein the fuel cell module.

BRIEF DESCRIPTION OF DRAWINGS

The objects, features, and advantages of the invention will become more apparent by reference to the following detailed description in conjunction with the accompanying drawings.

FIGS. 2A and 2B show the cell stack device shown in FIG. 1, wherein FIG. 2A is a side view of the cell stack device, and FIG. 2B is an enlarged sectional view of a part taken out of the construction shown in FIG. 2A, as viewed from above;

FIGS. 6A and 6B show the reformer taken out of the fuel cell module shown in FIG. 5 in which the reformer is housed, wherein FIG. 6A is a perspective view and FIG. 6B is a plan view;

FIG. 6B is disposed above the cell stack device according to the present embodiment;

DESCRIPTION OF EMBODIMENTS

Hereinafter, a fuel cell module and a fuel cell apparatus according to the present embodiment will be described with reference to drawings. Note that the corresponding constituent components in each of the different drawings are identified by corresponding reference designations.

Figure 1:
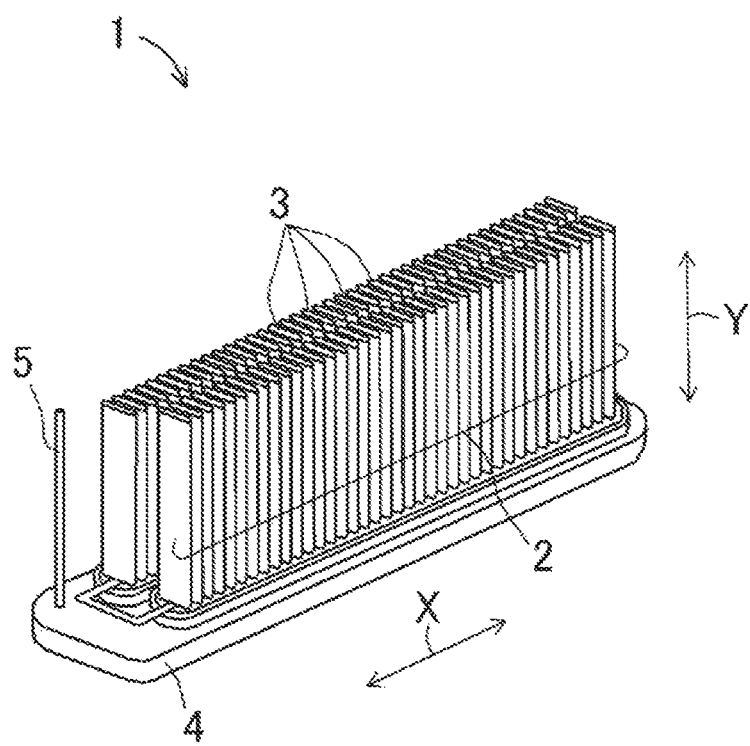
FIG. 1 is a perspective view showing an example of a cell stack device which is housed in a fuel cell module according to the present embodiment.
Figure 2A:
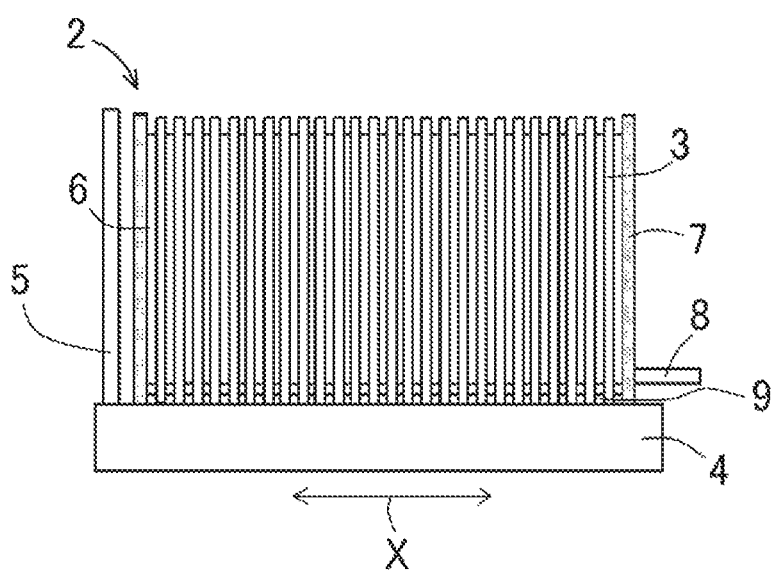
Figure 2B:
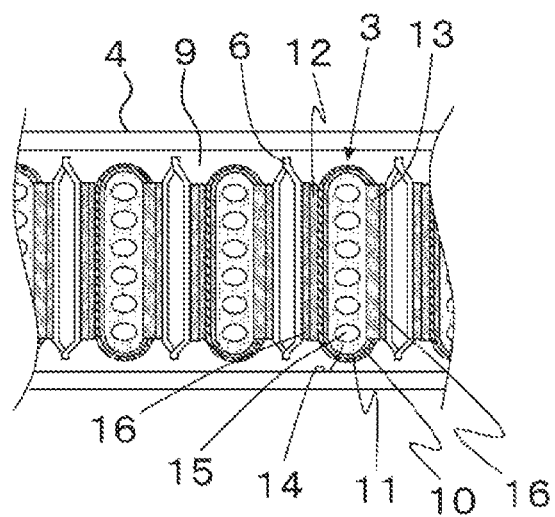

FIG. 1 is an external perspective view showing an example of a cell stack device constituting a fuel cell module according to the present embodiment, and, FIGS. 2A and 2B show the cell stack device, wherein FIG. 2A is a side view of the cell stack device, and FIG. 2B is an enlarged sectional view of a part taken out of the construction shown in FIG. 2A, as viewed from above.

In the cell stack device 1 shown in FIGS. 1, 2A and 2B, two cell stacks 2 are provided in juxtaposition. The cell stack 2 is composed of upstanding fuel cells 3 arranged in an array (X direction, as viewed in FIG. 1), the fuel cell 3 having an internal gas flow channel 15 through which a fuel gas is allowed to pass from one end to the other end. Moreover, the adjacent fuel cells 3 are electrically connected in series with each other via an electrically conductive member 6. In addition, in each of the two cell stacks 2, the lower end of the fuel cell 3 is secured to a manifold 4 by an insulating adhesive 9.

In FIG. 1 and FIGS. 2A and 2B, as an example of the fuel cell 3, there is shown a solid-oxide fuel cell 3 of hollow flat type having a plurality of internal gas flow channels 15 through which a fuel gas flows in a longitudinal direction thereof, the solid-oxide fuel cell 3 being constructed by laminating a fuel electrode layer, a solid electrolyte layer, and an oxygen electrode layer one after another in the order named on the surface of a support having the gas flow channels 15. An oxygen-containing gas is allowed to pass between the fuel cells 3. The structure of the fuel cell 3 will be described later. In the fuel cell apparatus according to the present embodiment, the fuel cell 3 may be shaped in, for example, a flat plate or a circular cylinder, and, the form of the cell stack device 1 may be suitably changed on an as needed basis.

Moreover, there is provided a cell stack support member 7 (which may hereafter be abbreviated as "stack support member 7") electrically connected via the electrically conductive member 6 to the outermost fuel cell 3 of the cell stack 2. The stack support member 7 may be externally provided with. The protective cover provides protection for the stack support member 7 and the cell stack 2 from contact with a heat insulator placed around the cell stack 2 or from external shock. Moreover, the stack support member 7 is connected with a current-extracting portion 8 protruding outwardly beyond the cell stack 2.

Although the cell stack device 1 is illustrated as comprising two cell stacks 2 in FIGS. 1, 2A and 2B, the number of the cell stacks 2 may be changed on an as needed basis. For example, the cell stack device 1 may be composed of a single cell stack 2. Moreover, the cell stack device 1 may include a reformer which will hereafter be described.

Moreover, the manifold 4 comprises: a gas case having an opening in an upper surface thereof, which retains a fuel gas which is fed to the fuel cell 3; and a frame body inside of which the fuel cell 3 is fastened, the frame body being secured to the gas case.

One end (lower end, as viewed in FIG. 2A) of the fuel cell 3 is surrounded by the frame body, and, the lower end of the fuel cell 3 is secured at an outer periphery thereof to the frame body via the insulating adhesive 9 set in a filled state inside the frame body. That is, the cell stack 2 is configured so that a plurality of fuel cells 3 are housed in the frame body while being arranged and are bonded to the frame body via the insulating adhesive 9. As the insulating adhesive 9, it is possible to use an adhesive made of glass, etc. with a predetermined filler added in consideration of a thermal expansion coefficient.

Moreover, there is connected to the upper surface of the manifold 4 a gas passage tube 5 through which a fuel gas generated by a reformer which will hereafter be described flows. The fuel gas is fed to the manifold 4 through the gas passage tube 5, and is then fed from the manifold 4 to the gas flow channel 15 provided within the fuel cell 3.

As shown in FIG. 2B, the fuel cell 3 has the form of a column (hollow flat plate, for example) composed of the columnar electrically conductive support 14 (which may hereafter be abbreviated as "the support") having a pair of opposed flat surfaces, on one of which the fuel-side electrode layer 10, the solid electrolyte layer 11, and the air-side electrode layer 12 are laminated one after another in the order named. Moreover, on the other one of the flat surfaces of the fuel cell 3, there is provided an interconnector 13 whose outer surface (upper surface) is provided with a P-type semiconductor layer 16. By connecting the electrically conductive member 6 to the interconnector 13 via the P-type semiconductor layer 16, it is possible to establish ohmic contact between the electrically conductive member 6 and the interconnector 13, and thereby reduce a drop in potential, wherefore deterioration in electricity collection capability can be avoided effectively. In FIG. 1, the electrically conductive member 6 and the stack support member 7 are omitted from the construction. Moreover, the support 14 may be configured to serve also as the fuel-side electrode layer 10, and, in this case, the cell can be constructed by successively laminating the solid electrolyte layer 11 and the air-side electrode layer 12 in the order named on the surface of the support 14.

The fuel-side electrode layer 10 may be formed of typical known materials, for example, porous electrically conductive ceramics such as $ZrO_2$ containing rare-earth element oxide in the form of solid solution (called stabilized zirconia, including partially-stabilized zirconia) and Ni, and/or NiO.

The solid electrolyte layer 11 is required to serve as an electrolyte for providing electron linkage between the fuel-side electrode layer 10 and the air-side electrode layer 12, and also to have a gas shutoff capability to prevent leakage of a fuel gas and an oxygen-containing gas, and is formed of $ZrO_2$ containing rare-earth element oxide in the form of solid solution in an amount of 3% to 15% by mole. Use can be made of other material which has the above described characteristics.

The air-side electrode layer 12 may be formed of any material commonly used therefor without special limitations, for example, electrically conductive ceramics composed of so-called $ABO_3$ perovskite oxide. The air-side electrode layer 12 is required to exhibit gas permeability, and may be designed to have an open porosity of greater than or equal to 20%, or an open porosity in a range of 30% to 50%.

The support 14 has gas permeability to allow a fuel gas to permeate to the fuel-side electrode layer 10, and also has electrical conductivity for conduction of electricity via the interconnector 13. Thus, as the support 14, use can be formed of electrically conductive ceramics and cermet, for example. In producing the fuel cell 3, in the case where the support 14 is formed through co-firing with the fuel-side electrode layer 10 or the solid electrolyte layer 11, it is advisable to form the support 14 from an iron-group metal component and a specific rare earth oxide. Moreover, in the fuel cell 3 shown in FIG. 2B, the columnar (hollow flat plate-shaped) support 14 has the form of an elongated plate-like piece extending in an upstanding direction (Y direction, as viewed in FIG. 1), and has flat opposite surfaces and semicircular opposite side faces. Moreover, it is preferable that the support 14 has an open porosity of greater than or equal to 30%, or an open porosity in a range of 35% to 50%, in particular, to exhibit gas permeability, and also, the support 14 may have an electrical conductivity of 300 S or greater/cm, or an electrical conductivity of 440 S or greater/cm, in particular. Moreover, the support 14 is given any of columnar shapes, including a cylindrical shape.

Exemplary of the P-type semiconductor layer 16 is a layer formed of transition metal perovskite oxide. More specifically, it is possible to use a material which is greater in electron conductivity than the material of construction of the interconnector 13, for example, P-type semiconductor ceramics composed of at least one of $LaMnO_3$-based oxide having Mn, Fe, Co, etc. in the B-site, $LaFeO_3$-based oxide, $LaCoO_3$-based oxide, and the like. Under normal circumstances, a thickness of the P-type semiconductor layer 16 may be set to a range of 30 μm to 100 μm.

The interconnector 13, as stated above, may be formed of lanthanum chromite-based perovskite oxide ($LaCrO_3$ oxide) or lanthanum strontium titanate-based perovskite oxide ($LaSrTiO_3$-based oxide). Such a material has electrical conductivity, and undergoes neither reduction nor oxidation when exposed to a fuel gas (hydrogen-containing gas) and an oxygen-containing gas (air, etc.). Moreover, it is advisable to render the interconnector 13 dense in texture for prevention of leakage of a fuel gas flowing through the gas flow channel 15 formed in the support 14 and an oxygen-containing gas flowing outside the support 14, and hence, the interconnector 13 may have a relative density of 93% or above, or 95% or above, in particular.

The electrically conductive member 6 and the stack support member 7 interposed for electrically connecting the fuel cell 3 may be constructed of a member formed of an elastic metal or alloy, or a member obtained by performing a predetermined surface treatment on a felt made of metallic fiber or alloy fiber.

Figure 3:
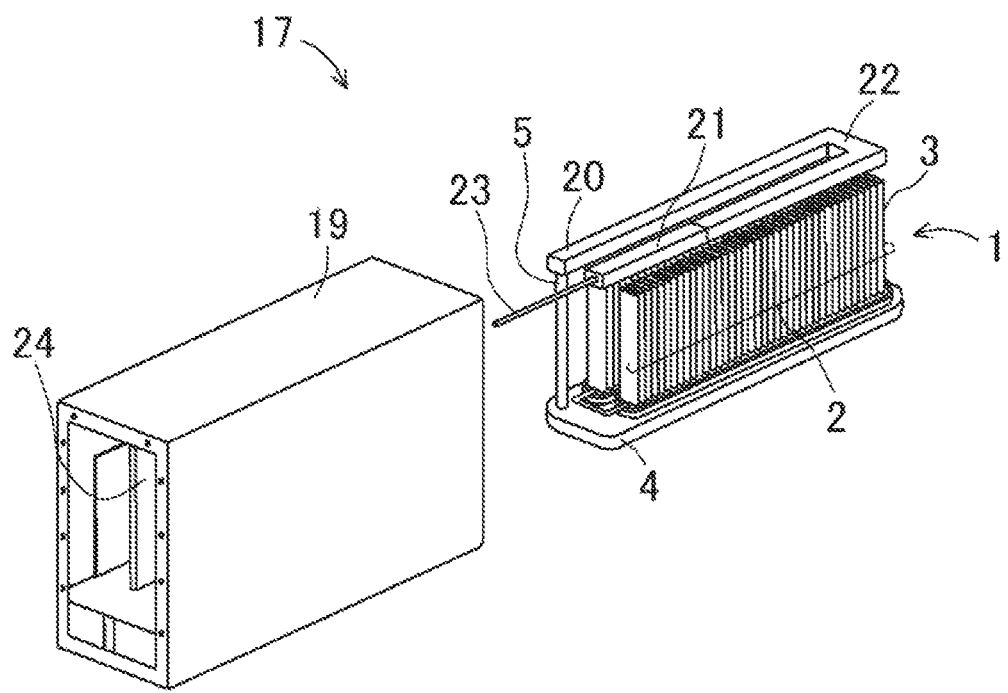
FIG. 3 is a perspective view showing a fuel cell module according to the present embodiment.
Figure 4:
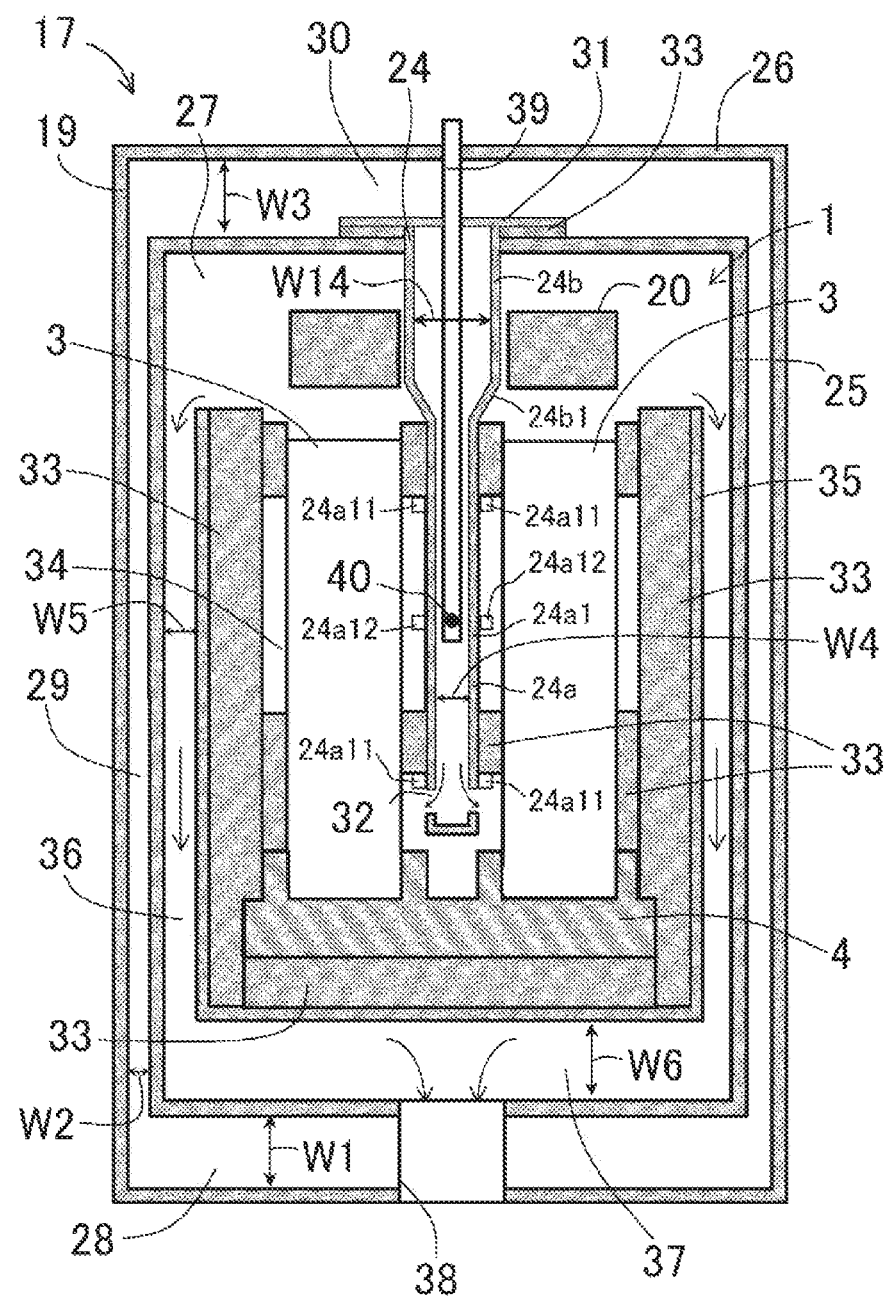
FIG. 4 is a sectional view of the fuel cell module shown in FIG. 3.

FIG. 3 is an exterior perspective view showing an example of a fuel cell module comprising the cell stack device according to the present embodiment, and, FIG. 4 is a sectional view of the fuel cell module shown in FIG. 3.

In the fuel cell module 17 shown in FIG. 3, the cell stack device 1 according to the present embodiment is housed in a housing 19. Above the cell stack device 1, there is provided a reformer 20 which generates a fuel gas which is fed to the fuel cell 3.

Moreover, the reformer 20 shown in FIG. 3 generates a fuel gas by reforming a raw fuel such as natural gas or kerosene delivered thereto via a raw fuel supply tube 23. The reformer 20 is capable of steam reforming under a reforming reaction with high reforming efficiency. The reformer 20 comprises: a vaporizing section 21 for vaporizing water; and a reforming section 22 provided with a reforming catalyst (not shown) for reforming a raw fuel into a fuel gas.

Moreover, in FIG. 3, there are shown the housing 19 with parts (front and rear surfaces) removed, and the internally housed cell stack device 1 in a state of lying just behind the housing 19. In the fuel cell module 17 shown in FIG. 3, the cell stack device 1 can be slidingly housed in the housing 19.

In the housing 19, there is provided an oxygen-containing gas supply member 24. The oxygen-containing gas supply member 24 is interposed between the cell stacks 2 disposed in juxtaposition on the manifold 4 to allow an oxygen-containing gas to flow between the fuel cells 3 from the lower end toward the upper end.

As shown in FIG. 4, the housing 19 constituting the fuel cell module 17 has a double-walled structure consisting of an inner wall 25 and an outer wall 26, wherein the outer wall 26 constitutes an outer frame of the housing 19, and the inner wall 25 defines a housing chamber 27 for housing therein the cell stack device 1.

The housing 19 is provided with an oxygen-containing gas introduction section 28 for introducing an oxygen-containing gas externally introduced into the housing chamber 27. After being introduced into the oxygen-containing gas introduction section 28, the oxygen-containing gas flows upwardly through an oxygen-containing gas passage section 29 defined by the inner wall 25 and the outer wall 26 corresponding to each side of the housing chamber 27, the oxygen-containing gas passage section 29 merging with the oxygen-containing gas introduction section 28. The oxygen-containing gas subsequently flows through an oxygen-containing gas distributing section 30 defined by the inner wall 25 and the outer wall 26 corresponding to the top of the housing chamber 27, the oxygen-containing gas distributing section 30 merging with the oxygen-containing gas passage section 29. In the oxygen-containing gas distributing section 30, the oxygen-containing gas supply member 24 serving as a gas supply section is fixedly received so as to pass through the inner wall 25. The oxygen-containing gas supply member 24 has, at an upper end thereof, an oxygen-containing gas inlet (not shown) for entry of an oxygen-containing gas and a flange portion 31, and also has, at a lower end thereof, an oxygen-containing gas outlet 32 to introduce an oxygen-containing gas into the lower end of the fuel cell 3. Thus, the oxygen-containing gas distributing section 30 and the oxygen-containing gas supply member 24 are connected to each other. A heat insulator 33 is interposed between the flange portion 31 and the inner wall 25.

It is noted that the possibility arises that due to heat exchange between the reformer and the oxygen-containing gas supply member the temperature of the reformer will be decreased. Such a decrease in temperature of the reformer may cause a decrease in reforming efficiency of the reformer, which may result in the lowering of power generation efficiency.

In this regard, the fuel cell module 17 according to the present embodiment is configured so that, in the oxygen-containing gas supply member 24, the gas flow channel has a first region and a second region which is greater than the first region in flow channel width in a direction perpendicular to a direction in which an oxygen-containing gas flows and the arrangement direction of the fuel cells. More specifically, the oxygen-containing gas supply member 24 comprises: a first supply portion 24a located between the two fuel cells 3 so as to constitute the first region of the gas flow channel; and a second supply portion 24b located in a space facing the reformer 20 so as to constitute the second region of the gas flow channel, the second supply portion 24b being continuous with, and in axial alignment with, the first supply portion 24a, and being provided at an upper end thereof with the above-described flange portion 31. The first supply portion 24a has a flow channel width W4 in the direction perpendicular to the oxygen-containing gas-flowing direction and the arrangement direction of the fuel cells 3 (a horizontal direction, as viewed in FIG. 4). The second supply portion 24b has a flow channel width W14 which is wider than the flow channel width W4 of the first supply portion 24a. For example, the flow channel width W4 of the first supply portion 24a falls in the range of 1 mm to 10 mm, whereas the flow channel width W14 of the second supply portion 24b falls in the range of 5 mm to 30 mm, for example. The lower end of the second supply portion 24b is formed with an inclined part 24b1 tapered so that the above-described flow channel width W14 is gradually reduced to the flow channel width W4 of the first supply portion 24a in a downstream direction along the flow of the oxygen-containing gas, and, the lower end of the inclined part 24b1 is continuous with the upper end of the first supply portion 24a, so that the first supply portion 24a and the second supply portion 24b define a continuous gas flow channel. In such a gas flow channel, the ratio of the flow channel width W14 of the second supply portion 24b to the flow channel width W4 of the first supply portion 24a (W14/W4) is adjusted to fall in the range of 1.5 to 10.

As described just above, the oxygen-containing gas supply member 24 is configured so that the flow channel width W14 of the second supply portion 24b is greater than the flow channel width W4 of the first supply portion 24a, wherefore a decrease in temperature of the reformer 20 resulting from heat exchange between the oxygen-containing gas supply member 24 and the reformer 20 can be suppressed. This is because a change in flow velocity between the oxygen-containing gas flowing through the first supply portion 24a and the oxygen-containing gas flowing through the second supply portion 24b is conducive to a change in the amount of heat exchange with the exterior of the oxygen-containing gas supply member 24. That is, the widening of the flow channel width W14 of the second supply portion 24b opposed to the reformer 20 makes it possible to reduce the flow velocity of the oxygen-containing gas, thus reducing the amount of heat exchange. This makes it possible to prevent a decrease in reforming efficiency of the reformer 20, and thereby increase the power generation efficiency. Moreover, in this case, as will hereafter be described, when burning a fuel gas unused for power generation in a location above the fuel cell 3, a temperature decrease in the vicinity of a burning section can be suppressed, wherefore an enhancement in combustibility can also be achieved.

Each of the opposite side surfaces of the first supply portion 24a opposed to corresponding one of the two cell stacks 2 is provided with at least three projections 24a1 protruding toward the cell stack 2. Of the three projections 24a1, at least two projections 24a11 made as an upper projection and a lower projection, respectively, support the heat insulator 33, and, a projection 24a12 located therebetween protrudes into a space within an opening 34 without supporting the heat insulator 33. The projection 24a12 free of the retention of the heat insulator 33 permits an improvement in return and convection of air leaked sidewardly from the cell stack 2 toward between the cell stacks 2 within the opening 34, and also renders the temperature distribution of the cell stack 2 uniform.

Although, in FIG. 4, the oxygen-containing gas supply member 24 is arranged between the two cell stacks 2 disposed in juxtaposition in the housing 19, the arrangement may be suitably changed depending upon the number of the cell stacks 2. For example, in the case of housing only one cell stack 2 in the housing 19, two oxygen-containing gas supply members 24 may be arranged so as to sandwich the cell stack 2 from both sides thereof.

Moreover, in the housing chamber 27, there is provided a heat insulator 33 on an as needed basis for maintaining the internal temperature of the fuel cell module 17 at a high-temperature level to prevent a reduction in the amount of electric power generation caused by extreme dissipation of heat within the fuel cell module 17 and a consequent decrease in temperature of the fuel cell 3 (the cell stack 2).

The heat insulator 33 may be placed in the vicinity of the cell stack 2, and, it is particularly advisable to place the heat insulator 33 on a lateral side of the cell stack 2 along the arrangement direction of the fuel cells 3, as well as to place the heat insulator 33 having a width which is equivalent to or greater than the width of each lateral side of the cell stack 2 along the arrangement direction of the fuel cells 3. The heat insulator 33 may be placed on each lateral side of the cell stack 2. This makes it possible to suppress a decrease in temperature of the cell stack 2 effectively. Moreover, the oxygen-containing gas introduced via the oxygen-containing gas supply member 24 is restrained from being discharged sidewardly from the cell stack 2, thus facilitating the flow of the oxygen-containing gas between the fuel cells 3 constituting the cell stack 2. Note that the heat insulators 33 disposed on opposite sides, respectively, of the cell stack 2 are each provided with an opening 34 for adjusting the flow of the oxygen-containing gas which is fed to the fuel cell 3 and reducing variations in temperature distribution in the longitudinal direction of the cell stack 2, as well as in the stacking direction of the fuel cell 3.

Moreover, inside the inner wall 25 lying along the arrangement direction of the fuel cells 3, there is provided an inner wall for exhaust gas 35, and, a region between the inner wall 25 at each side of the housing chamber 27 and the inner wall for exhaust gas 35 defines an exhaust gas passage section 36 through which an exhaust gas within the housing chamber 27 flows downwardly.

Moreover, in the lower part of the housing chamber 27 located above the oxygen-containing gas introduction section 28, there is provided an exhaust gas collecting section 37 merging with the exhaust gas passage section 36. The exhaust gas collecting section 37 communicates with a vent hole 38 formed in the bottom portion of the housing 19. Moreover, the inner wall for exhaust gas 35 is also provided on a side of the cell stack 2 with the heat insulator 33.

Thus, an exhaust gas generated during the operation of the fuel cell module 17 (on start-up, during electric power generation, and at halting) flows through the exhaust gas passage section 36 and the exhaust gas collecting section 37, and is thereafter discharged from the vent hole 38. The vent hole 38 may be formed either by cutting part of the bottom portion of the housing 19 or by placement of a tubular member at the bottom portion.

Moreover, inside the oxygen-containing gas supply member 24, a thermocouple 39 for measuring temperature near the cell stack 2 is arranged so that a temperature-measuring section 40 thereof is centered in the longitudinal direction of the fuel cell 3 (a vertical direction, as viewed in FIG. 4), as well as in the arrangement direction of the fuel cells 3 (a direction perpendicular to a plane of the paper sheet of FIG. 4).

Moreover, in the fuel cell module 17 thereby constructed, the temperature of the fuel cell 3 can be raised and maintained by burning the oxygen-containing gas and a fuel gas unused for power generation discharged through the gas flow channel 15 of the fuel cell 3 in a location between the upper end of the fuel cell 3 and the reformer 20. Besides, the reformer 20 located above the fuel cell 3 (the cell stack 2) can be heated, wherefore a reforming reaction occurs efficiently in the reformer 20. During normal electric power-generating operation, with the above-described burning process and power generation in the fuel cell 3, the internal temperature of the fuel cell module 17 is raised to about between 500° C. to 800° C.

In the interest of improvement in power generation efficiency in the fuel cell 3, each flow channel through which the oxygen-containing gas flows can be configured for efficient oxygen-containing gas flow. That is, the fuel cell module 17 shown in FIG. 4 may be structured for efficient flow and uniform distribution of the oxygen-containing gas which is introduced into the oxygen-containing gas introduction section 28, flows over each side of the housing chamber 27, and is introduced through the oxygen-containing gas distributing section 30 into the oxygen-containing gas supply member 24.

Thus, in the fuel cell module 17 according to the present embodiment, firstly, in the case where a flow channel width W1 of the oxygen-containing gas introduction section 28 and a flow channel width W2 of the oxygen-containing gas passage section 29 are compared, the flow channel width W2 of the oxygen-containing gas passage section 29 is narrower than the flow channel width W1 of the oxygen-containing gas introduction section 28. This allows the oxygen-containing gas introduced into the oxygen-containing gas introduction section 28 to flow efficiently to the oxygen-containing gas passage section 29.

The flow channel width W2 of the oxygen-containing gas passage section 29 may be adjusted to an extent that would prevent occurrence of a blockage in the oxygen-containing gas passage section 29 even if the inner wall 25 or the outer wall 26 becomes deformed due to deterioration in the housing 19 with age, and it is advisable for the flow channel width W2 to fall in the range of one-third to one-thirtieth of the flow channel width W1 of the oxygen-containing gas introduction section 28. Although the flow channel width W1 of the oxygen-containing gas introduction section 28 is not limited to any specific value, when the width is too large, there arises the problem of an increase in size of the fuel cell module 17.

Note that when the oxygen-containing gas passage sections 29 located on opposite lateral sides, respectively, of the housing chamber 27 are compared, variation between their flow channel widths W2 can be tolerated within ±10% limits. Thus, after being introduced into the oxygen-containing gas introduction section 28, the oxygen-containing gas is allowed to flow over each lateral side of the housing chamber 27 in substantially the same amount.

Figure 5:
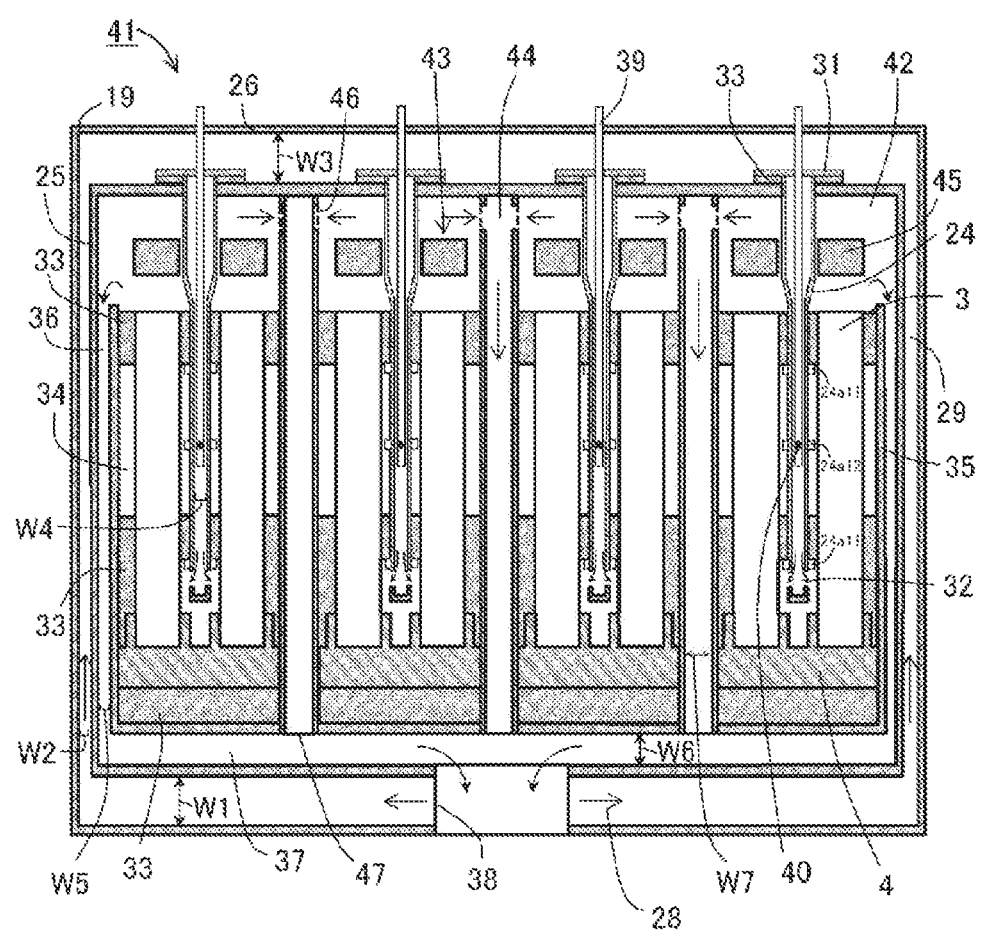
FIG. 5 is a sectional view showing a fuel cell module according to the another embodiment.

Next, as shown in FIGS. 4 and 5, in the case where a flow channel width W3 of the oxygen-containing gas distributing section 30 and the flow channel width (inner width) W4 of the oxygen-containing gas supply member 24 are compared, the flow channel width W4 of the first supply portion 24*a* of the oxygen-containing gas supply member 24 is narrower than the flow channel width W3 of the oxygen-containing gas distributing section 30. This allows the oxygen-containing gas introduced into the oxygen-containing gas distributing section 30 to flow efficiently to the oxygen-containing gas supply member 24.

The flow channel width W4 of the oxygen-containing gas supply member 24 may be adjusted to an extent that would prevent occurrence of a blockage in the oxygen-containing gas supply member 24 even if the oxygen-containing gas supply member 24 becomes deformed due to deterioration with age, and it is advisable for the flow channel width W4 to fall in the range of one-half to one-thirtieth of the flow channel width W3 of the oxygen-containing gas distributing section 30. Although the flow channel width W3 of the oxygen-containing gas distributing section 30 is not limited to any specific value, when the width is too large, there arises the problem of an increase in size of the fuel cell module 17. Note that the above-described flow channel widths may be determined with consideration given to pressure loss at the oxygen-containing gas outlet 32.

Meanwhile, in the housing chamber 27, there arise exhaust gases such as a fuel gas unused for power generation, the oxygen-containing gas, and a combustion gas resulting from the burning of the fuel gas are generated. Efficient discharge of such exhaust gases out of the housing 19 leads to efficient supply of the oxygen-containing gas to the fuel cell 3.

Hence, in the fuel cell module 17 according to the present embodiment, in the case where a flow channel width W5 of the exhaust gas passage section 36 located at each lateral side of the housing chamber 27 and a flow channel width W6 of the exhaust gas collecting section 37 located on a lower side of the housing chamber 27 are compared, the flow channel width W5 of the exhaust gas passage section 36 is narrower than the flow channel width W6 of the exhaust gas collecting section 37. This allows the exhaust gases that have flowed through the exhaust gas passage section 36 on the respective lateral sides of the housing chamber 27 are efficiently mixed with each other in the exhaust gas collecting section 37, and the mixture is discharged out of the construction efficiently through the vent hole 38.

The flow channel width W5 of the exhaust gas passage section 36 may be adjusted to an extent that would prevent occurrence of a blockage in the exhaust gas passage section 36 even if the exhaust gas passage section 36 becomes deformed due to deterioration with age, and it is advisable for the flow channel width W5 to fall in the range of one-third to one-thirtieth of the flow channel width W6 of the exhaust gas collecting section 37. Although the flow channel width W6 of the exhaust gas passage section 36 is not limited to any specific value, when the width is too large, there arises the problem of an increase in size of the fuel cell module 17.

When the exhaust gas passage sections 36 located at opposite lateral sides, respectively, of the housing chamber 27 are compared, variation between their flow channel widths W5 can be tolerated within ±10% limits. Thus, the exhaust gas present in the housing chamber 27 is allowed to flow through each lateral side of the housing chamber 27 in substantially the same amount.

Moreover, an electrolysis module can be obtained by placing, in the housing chamber 27 of the above-described fuel cell module 17, an electrolysis cell stack device comprising an array of electrolysis cells capable of producing hydrogen with application of water vapor and voltage which serve as cells. In this case, oxygen is discharged from the electrolysis cell as a by-product of production of hydrogen from water vapor. However, in the presence of a high concentration of oxygen in the housing chamber 27, ignition may occur on some kind of impact, or the electrolysis cell in itself may suffer quality degradation by oxidation.

Hence, in this case, the likelihood of ignition and quality degradation in the electrolysis cell can be suppressed by using air as the first gas to effect a purge in the interior of the housing chamber 27 (in other words, by replacing a high concentration of oxygen with the air). That is, in this case, a gas containing a high concentration of oxygen becomes an exhaust gas. Thus, the electrolysis module comprising the electrolysis cell stack device is also built as a highly efficient module (a module having high electrolysis efficiency).

Figure 6A:
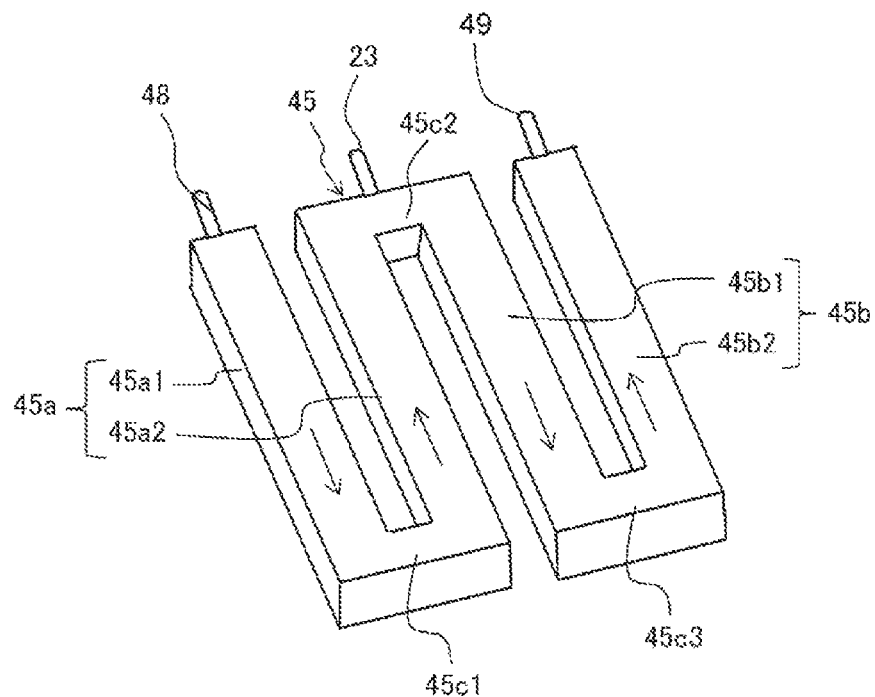
Figure 6B:
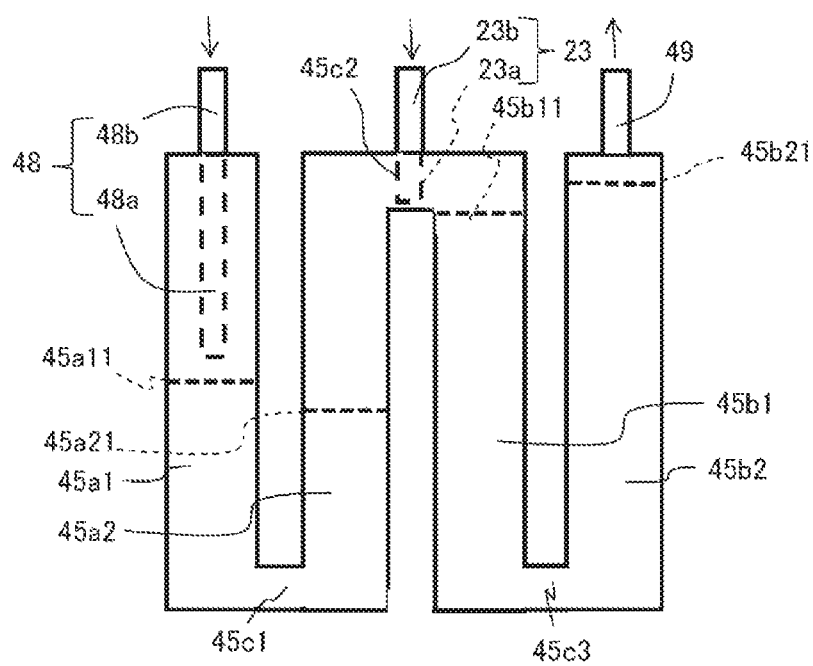

FIG. 5 is a sectional view showing another example of the fuel cell module according to the present embodiment. A fuel cell module 41 as shown in FIG. 5 differs from the fuel cell module 17 shown in FIG. 4 in that four cell stack devices 43 are placed in a housing chamber 42, that a exhaust gas passage member 44 is disposed in each cell stack device 43-to-cell stack device 43 region, and that a single reformer 45 is located above the four cell stacks as shown in FIGS. 6A and 6B. Note that such constituent components as are common to those of the fuel cell module 17 shown in FIG. 4 will be identified with the same reference designations, and the description of the common components will be omitted.

In the case of housing the plurality of cell stack devices 43 in the housing chamber 42, the fuel cell 3 of the centrally located cell stack device 43, in particular, is located at long distance from the exhaust gas passage section 36 located on a lateral side of the housing chamber 42. Hence, there may be cases where exhaust gases from the fuel cell 3 of the centrally located cell stack device 43 cannot be discharged to the outside with efficiency.

Especially in the fuel cell apparatus configured so that a fuel gas unused for power generation is burned on the upper end side of the fuel cell 3 and the resultant combustion heat is utilized to maintain the temperature of the fuel cell 3 at a high level, staying of exhaust gases on the upper end side of the fuel cell 3 may cause a failure of combustion of the fuel gas unused for power generation, with the consequent occurrence of combustion misfiring. In the event of combustion misfiring in particular, the fuel cell 3 fails to undergo a temperature rise or cannot be maintained in high-temperature conditions, which may result in a reduction in the amount of electric power generation in the fuel cell 3 (cell stack device 43).

Hence, in the fuel cell module 41 shown in FIG. 5, in addition to the above-described exhaust gas passage section 36, the exhaust gas passage member 44 is provided between the adjacent cell stack devices 43 for discharging an exhaust gas unused for power generation.

In the exhaust gas passage member 44 composed of a tubular container, an upper end thereof has exhaust gas inlets 46 provided on each lateral side thereof so as to communicate with the housing chamber 42, and an outlet 47 which is a lower end thereof communicates with the exhaust gas collecting section 37 located on a lower side of the housing chamber 42. While, in FIG. 5, the exhaust gas passage member 44 is, as exemplified, composed of a tubular container in the form of a rectangular prism in outward appearance, or equivalently a quadrangular prism-shaped container, an arrangement of a plurality of cylindrical containers may be adopted instead.

That is, either the exhaust gas passage section 36 or the exhaust gas passage member 44 is disposed on the lateral side of each cell stack device 43, and, an exhaust gas unused for power generation flows efficiently through one of the exhaust gas passage section 36 and the exhaust gas passage member 44 that is closer to the corresponding cell stack 2 constituting each cell stack device 43.

This arrangement makes it possible to suppress staying of exhaust gases emissions on the upper end of the fuel cell 3, and thus permits efficient discharge of exhaust gases, and also, in the cell stack device 43 in which burning is effected above the fuel cell 3, the occurrence of combustion misfiring can be suppressed, whereby the fuel cell module 41 in which the amount of electric power generation is improved can be realized.

In the case where a flow channel width W7 of the exhaust gas passage member 44 and the flow channel width W6 of the exhaust gas collecting section 37 located on the lower side of the housing chamber 42 are compared, the flow channel width W7 of the exhaust gas passage member 44 is narrower than the flow channel width W6 of the exhaust gas collecting section 37. This allows the exhaust gases that have flowed through their respective exhaust gas passage members 44 are efficiently mixed with each other in the exhaust gas collecting section 37, and the mixture is discharged out of the construction through the vent hole 38.

More specifically, it is advisable for the flow channel width W7 of the exhaust gas passage member 44 to fall in the range of one-third to one-thirtieth of the flow channel width W6 of the exhaust gas collecting section 37. Although the flow channel width W6 of the exhaust gas collecting section 37 is not limited to any specific value, when the width is too large, there arises the problem of an increase in size of the fuel cell module 41.

Note that when the individual exhaust gas passage members 44 are compared, variation between their flow channel widths W7 can be tolerated within ±10% limits. Thus, the exhaust gas flows through each exhaust gas passage member 44 in substantially the same amount.

Figure 7:
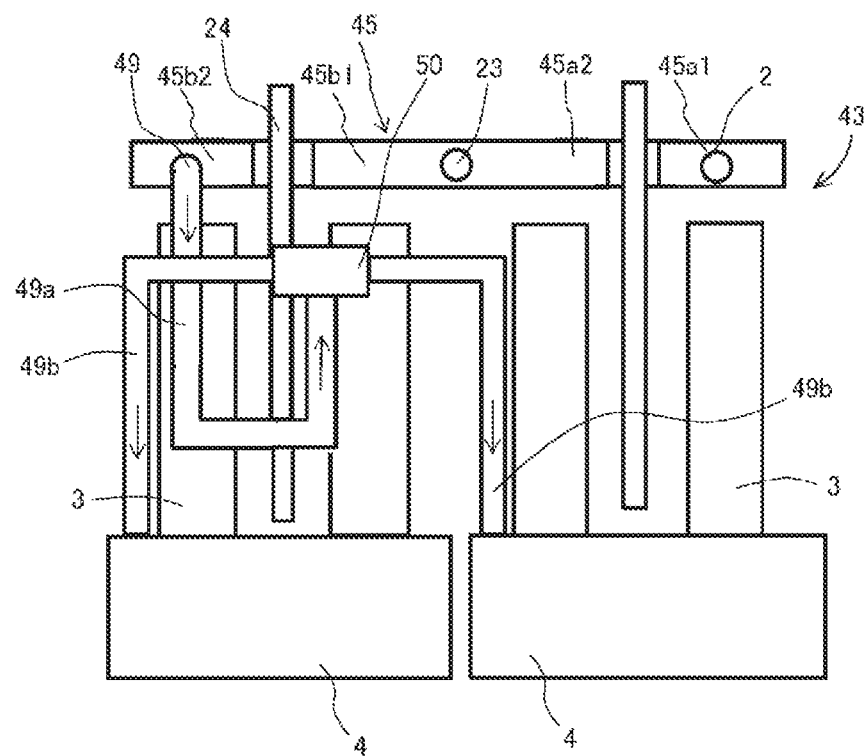
FIG. 7 is a side view showing an example of a construction in which the reformer shown in FIG. 6A

FIG. 6A and FIG. 6B are an enlarged perspective view and plan view, respectively, showing the reformer housed in the fuel cell module shown in FIG. 5, and, FIG. 7 is a side view showing an example of a construction in which the reformer as shown in FIGS. 6A and 6B is disposed above the cell stack device according to the present embodiment.

In the fuel cell module 41 shown in FIG. 5, the W-shaped reformer 45 (in meandering form) shown in FIGS. 6A and 6B is disposed above four cell stacks 2. As shown in FIGS. 6A and 6B, the reformer 45 comprises: a vaporizing section 45a for generating water vapor by vaporizing water; and a reforming section 45b for performing steam reforming on a raw fuel with use of the water vapor generated by the vaporizing section 45a.

The vaporizing section 45a comprises: a vaporizing section forward path 45a1 through which water vapor flows from one end to the other end thereof; and a vaporizing section backward path 45a2 through which water vapor flows from the other end to one end thereof. Moreover, the vaporizing section forward path 45a1 comprises a tubular portion 48a protruding inwardly along the vaporizing section forward path 45a1 from one end thereof, and a water supply portion 48b connected to the one end to feed water to the tubular portion 48a. The tubular portion 48a may be made either in separate form or in unitary form; that is, in the former, the tubular portion 48a is disposed so as to extend inwardly from an edge of a tubular body constituting the vaporizing section 45a, and a water supply tube 48 serving as the water supply portion 48b is connected to, and in axial alignment with, the tubular portion 48a, whereas, in the latter, the water supply tube 48 serving as the water supply portion 48b is inserted into the tubular body from the outside, and part of the water supply tube 48 serves also as the tubular portion 48a. The following description deals with the unitary form using the water supply tube 48 inserted into the tubular body from the outside.

Moreover, the reforming section 45b comprises: a reforming section forward path 45b1 through which a reformed gas flows from one end to the other end thereof, the reformed gas being generated by reforming a raw fuel supplied via the raw fuel supply tube 23 serving as a raw fuel supply section; and a reforming section backward path 45b2 through which the reformed gas flows from the other end to one end thereof. A reformed gas lead-out tube 49 for leading out the reformed gas is connected to the reforming section backward path 45b2. In the reformer 45 shown in FIGS. 6A and 6B, the water supply tube 48, the raw fuel supply tube 23, and the reformed gas lead-out tube 49 are connected to one end of the reformer 45.

Moreover, in the reformer 45, the other end of the vaporizing section forward path 45a1 and the other end of the vaporizing section backward path 45a2 are coupled by a coupling path 45c1 (hereafter referred to as "vaporizing section coupling path"). In addition, one end of the vaporizing section backward path 45a2 and one end of the reforming section forward path 45b1 are coupled by a coupling path 45c2 (hereafter referred to as "vaporizing/reforming section coupling path"). Further, the other end of the reforming section forward path 45b1 and the other end of the reforming section backward path 45b2 are coupled by a coupling path 45c3 (hereafter referred to as "reforming section coupling path). The vaporizing section forward path 45a1, the vaporizing section backward path 45a2, the reforming section forward path 45b1, and the reforming section backward path 45b2 are juxtaposed so as to face their side surfaces.

In the reformer 45, water supplied to the vaporizing section forward path 45a1 becomes water vapor, and the water vapor flows through the vaporizing section coupling path 45c1, the vaporizing section backward path 45a2, the vaporizing/reforming section coupling path 45c2, and the reforming section forward path 45b1 one after another in the order named. Moreover, a raw fuel is fed to the vaporizing/reforming section coupling path 45c2 from the raw fuel supply tube 23 serving as a raw fuel supply section 23b, is mixed with water vapor in the vaporizing/reforming section coupling path 45c2, flows through the reforming section forward path 45b1, the reforming section coupling path 45c3, and the reforming section backward path 45b2 while undergoing a reforming reaction to generate a reformed gas containing hydrogen (a fuel gas), and is exhausted in the form of the fuel gas from the reformed gas lead-out tube 49.

The vaporizing section forward path 45$a$1, the vaporizing section backward path 45$a$2, the reforming section forward path 45$b$1, the reforming section backward path 45$b$2, the vaporizing section coupling path 45$c$1, the vaporizing/reforming section coupling path 45$c$2, and the reforming section coupling path 45$c$3 are each composed of a tubular body which is rectangular in transverse section perpendicular to the axis.

Moreover, partition sheets 45$a$11 and 45$a$21 are disposed inside the vaporizing section forward path 45$a$1 and the vaporizing section backward path 45$a$2, respectively, so that a region between these partition sheets 45$a$11 and 45$a$21 defines a vaporizing chamber, and, the head part (tubular portion) of the water supply tube 48 is positioned on the upstream side of the partition sheet 45$a$11 so as to deliver water to a location just ahead of the vaporizing chamber. Ceramic balls having an average particle size of, for example, greater than or equal to 1 mm but less than or equal to 10 mm are housed in the vaporizing chamber to facilitate vaporization, and, the partition sheets 45$a$11 and 45$a$21 are each composed of a porous sheet body which, while being pervious to water vapor, does not permit the passage of the ceramic balls therethrough. The arrangement of the partition sheets 45$a$11 and 45$a$21 may be suitably changed depending upon the structure of the reformer, the cell stack structure which will hereafter be described, etc.

Further, partition sheets 45$b$11 and 45$b$21 are disposed in the reforming section forward path 45$b$1 and the reforming section backward path 45$b$2, respectively, and, the reforming section forward path 45$b$1, the reforming section coupling path 1$c$3, and the reforming section backward path 45$b$2 which are located between the partition sheets 45$b$11 and 45$b$21 define a reforming chamber. Reforming catalysts having an average particle size of, for example, greater than or equal to 1 mm but less than or equal to 10 mm are housed in the reforming chamber. The partition sheets 45$b$11 and 45$b$21 are each constructed of a porous sheet body which, while being pervious to a gas such as water vapor, a raw fuel, a reformed gas, etc., is made impervious to the reforming catalysts. The arrangement of the partition sheets 45$b$11 and 45$b$21 may be suitably changed depending upon the structure of the reformer, the cell stack structure which will hereafter be described, etc.

In such a reformer 45, the raw fuel supply tube 23 which is the raw fuel supply section 23$b$ which supplies a raw fuel is connected to the vaporizing/reforming section coupling path 45$c$2 between the vaporizing section 45$a$ and the reforming section 45$b$. In such a reformer 45, since the raw fuel supply tube 23 is connected to the vaporizing/reforming section coupling path 45$c$2 located downstream from the vaporizing section forward path 45$a$1 connected with the water supply tube 48, a water supply point and a raw fuel supply point are located through a space between the tubular body constituting the vaporizing section forward path 45$a$1 and the tubular body constituting the vaporizing section backward path 45$a$2, and also, in terms of the direction in which water vapor flows, a length in the flowing direction is long. Hence, even if a raw fuel is of a low temperature, at a point of time when an additional raw fuel is mixed, most of the supplied water has been vaporized, and thus it is possible to suppress a decrease in temperature of part of the reformer 45 (the vaporizing section forward path 45$a$1). This makes it possible to increase the reforming efficiency.

Then, as shown in FIG. 7, the reformed gas (fuel gas) generated by the reformer 45 is fed to two manifolds 4 by the reformed gas lead-out tube 49, and is fed through each manifold 4 to the gas flow path 15 within the furl cell 3.

As shown in FIG. 7, the reformed gas generated by the reformer 45 is fed, through a distributor 50, to the two manifolds 4 by the reformed gas lead-out tube 49. That is, the reformed gas lead-out tube 49 comprises: a U-shaped first reformed gas lead-out tube 49$a$ extending from the reformer 45 to the distributor 50; and second reformed gas lead-out tubes 49$b$ extending downwardly from the distributor 50 to the two manifolds 4, respectively. For the purpose of feeding the reformed gas to the manifolds 4 uniformly, the first reformed gas lead-out tube 49$a$ and the second reformed gas lead-out tube 49$b$ have the same length in consideration of pressure loss.

In the reformer 45, the vaporizing section forward path 45$a$1, the vaporizing section backward path 45$a$2, the reforming section forward path 45$b$1, and the reforming section backward path 45$b$2 are each disposed above corresponding one of the cell stacks 2. This allows each of the vaporizing section forward path 45$a$1, the vaporizing section backward path 45$a$2, the reforming section forward path 45$b$1, and the reforming section backward path 45$b$2 to be heated efficiently.

Moreover, other structural features (for example, the positions of the water supply tube 48, the partition sheets 45$a$11, 45$a$21, 45$b$11, and 45$b$21, etc.) may be suitably changed on an as needed basis without being limited to the foregoing.

Figure 8:
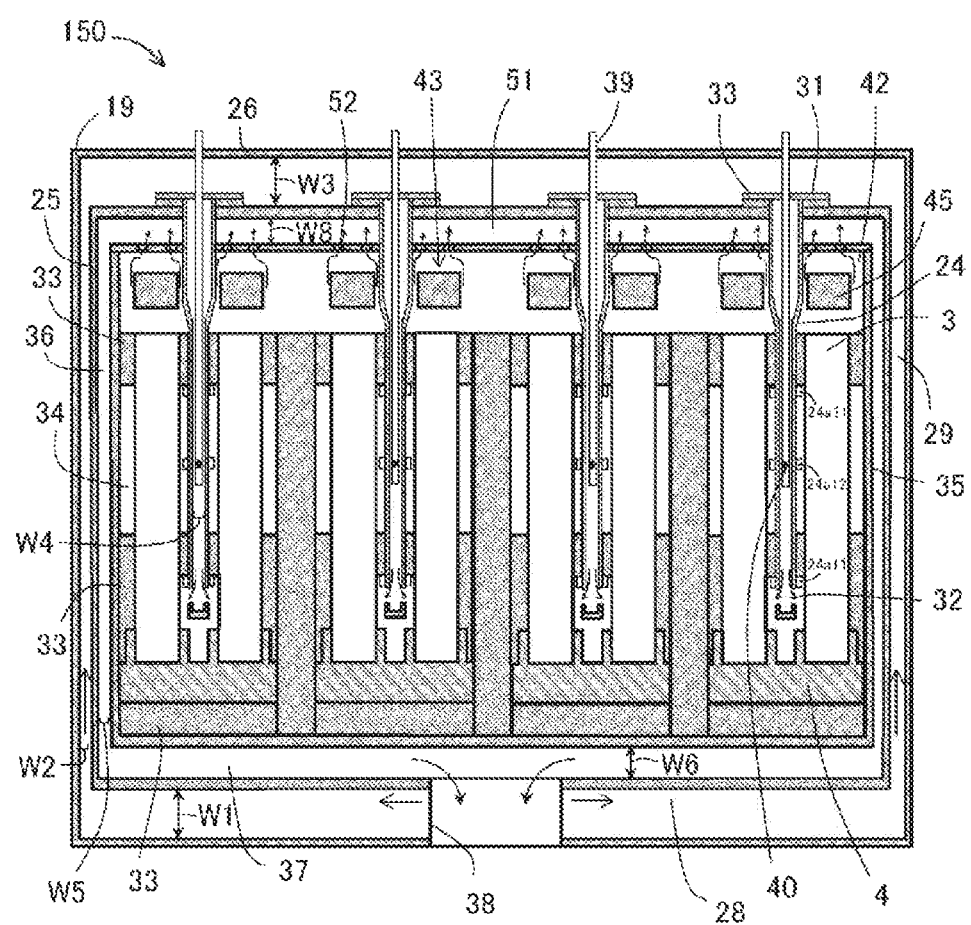
FIG. 8 is a sectional view showing a fuel cell module according to the another embodiment.

FIG. 8 is a sectional view showing still another example of the fuel cell module according to the present embodiment. A fuel cell module 150 as shown in FIG. 8 differs from the fuel cell module 41 shown in FIG. 5 in that the fuel cell module 150 is devoid of the exhaust gas passage member 44 disposed in each cell stack device 43-to-cell stack device 43 region, and yet has an exhaust gas collecting section 51 for collecting exhaust gases from the fuel cell 3, the exhaust gas collecting section 51 being located above the housing chamber 42, the exhaust gas collecting section 51 merging with the exhaust gas passage section 36.

The fuel cell module 41 shown in FIG. 5, while having the advantage of being capable of efficient discharge of exhaust gases from the fuel cell 3 out of the construction, has room for improvement in respect of heat exchange between an externally supplied oxygen-containing gas and an exhaust gas from the fuel cell 3, because the exhaust gas flowing through the exhaust gas passage member 44 undergoes no heat exchange with the externally supplied oxygen-containing gas.

In this regard, in the fuel cell module 150 shown in FIG. 8, there is provided the exhaust gas collecting section 51 located above the housing chamber 42, the exhaust gas collecting section 51 collecting exhaust gases from the fuel cell 3, and, since the exhaust gas collecting section 51 merges with the exhaust gas passage section 36, heat exchange can take place between the externally supplied oxygen-containing gas and the total amount of exhaust gases from the fuel cell 3. This makes it possible to feed the oxygen-containing gas kept at an elevated temperature to the fuel cell 3, and thereby increase the power generation efficiency.

It is advisable to allow the exhaust gas collected in the exhaust gas collecting section 51 to flow efficiently to the exhaust gas passage section 36. Hence, in the fuel cell module 150 according to the present embodiment, in the case where the flow channel width W5 of the exhaust gas passage section 36 located laterally of the housing chamber 42 and a flow channel width W8 of the exhaust gas collecting section 51 are compared, the flow channel width W5 of the exhaust gas passage section 36 is narrower than the flow channel width W8 of the exhaust gas collecting section 51. Thus, the exhaust gas collected in the exhaust gas collecting section 51 is allowed to flow efficiently to the exhaust gas passage section 36 located on each side of the housing chamber 42. This makes it possible to improve heat exchange with the oxygen-containing gas, and to increase power generation efficiency.

It is advisable that the flow channel width W5 of the exhaust gas passage section 36 falls in the range of one-third to one-thirtieth of the flow channel width W8 of the exhaust gas collecting section 51. Although the flow channel width W8 of the exhaust gas collecting section 51 is not limited to any specific value, when the width is too large, there arises the problem of an increase in size of the fuel cell module 150.

Moreover, the bottom surface of the exhaust gas collecting section 51 is provided with a collecting hole 52 merging with the housing chamber 42. Thus, the exhaust gas discharged into the housing chamber 42 flows through the collecting hole 52 to the exhaust gas collecting section 51.

Figure 9:
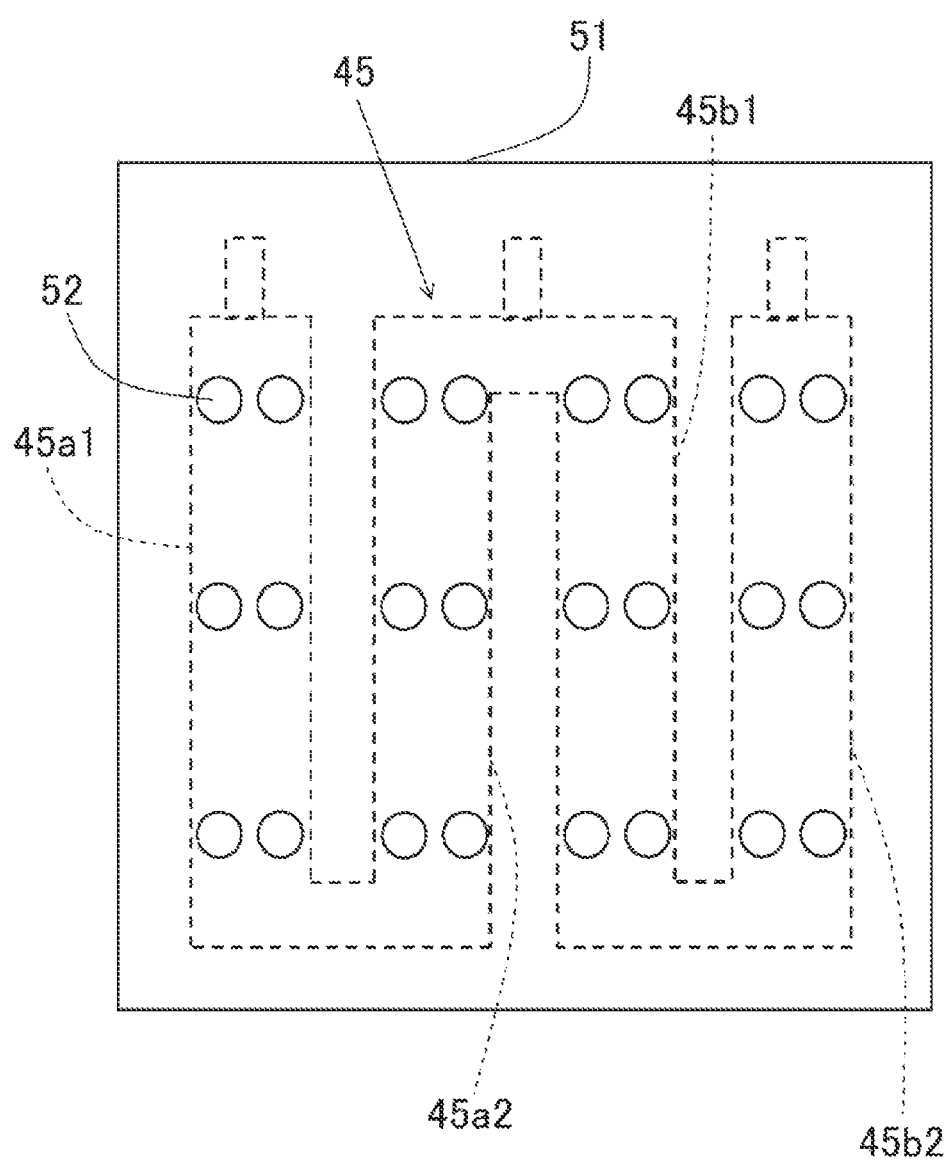
FIG. 9 is a plan view showing a part taken out of the bottom surface of an exhaust gas collecting section of the fuel cell module according to the present embodiment.

FIG. 9 is a plan view showing part of the bottom surface of the exhaust gas collecting section in enlarged dimension, wherein the contour of the reformer 45 is indicated by a broken line for a fuller understanding of positional relation with respect to the reformer 45. As shown in FIG. 9, there are provided a plurality of collecting holes 52 at the bottom surface of the exhaust gas collecting section 51 so as to face the reformer 45. As described earlier, the reformer 45 is heated by the combustion heat resulting from the burning of the exhaust gas from the fuel cell 3, and as a result it is possible to increase reforming efficiency. It is thus advisable that the exhaust gas from the fuel cell 3 (exhaust combustion gas) flows to the exhaust gas collecting section 51 after flowing around the reformer 45.

Hence, in the fuel cell module 150 according to the present embodiment, the collecting holes 52 are opposed to the reformer 45. With this arrangement, the exhaust gas from the fuel cell 3 (exhaust combustion gas) is allowed to flow to the exhaust gas collecting section 51 efficiently after flowing around the reformer 45. This makes it possible to raise the temperature of the reformer 45 efficiently, and thereby increase the reforming efficiency.

In FIG. 9, while the same number (six in this embodiment) of collecting holes 52 are provided so as to be opposed to the vaporizing section forward path 45$a$1, the vaporizing section backward path 45$a$2, the reforming section forward path 45$b$1, and the reforming section backward path 45$b$2, respectively, in the reformer 45, the number of the collecting holes 52 is not limited to this.

For example, in the reformer 45, the vaporizing section forward path 45$a$1 is susceptible to a temperature decrease under an endothermic reaction entailed by water vaporization, and this may lead to a decrease in temperature of the cell stack 2 located below the vaporizing section forward path 45$a$1. Hence, for the purpose of raising the temperature of the vaporizing section forward path 45$a$1, the number of the collecting holes 52 opposed to the vaporizing section forward path 45$a$1 may be increased. The number and arrangement of the collecting holes 52 can be suitably determined.

Figure 10:
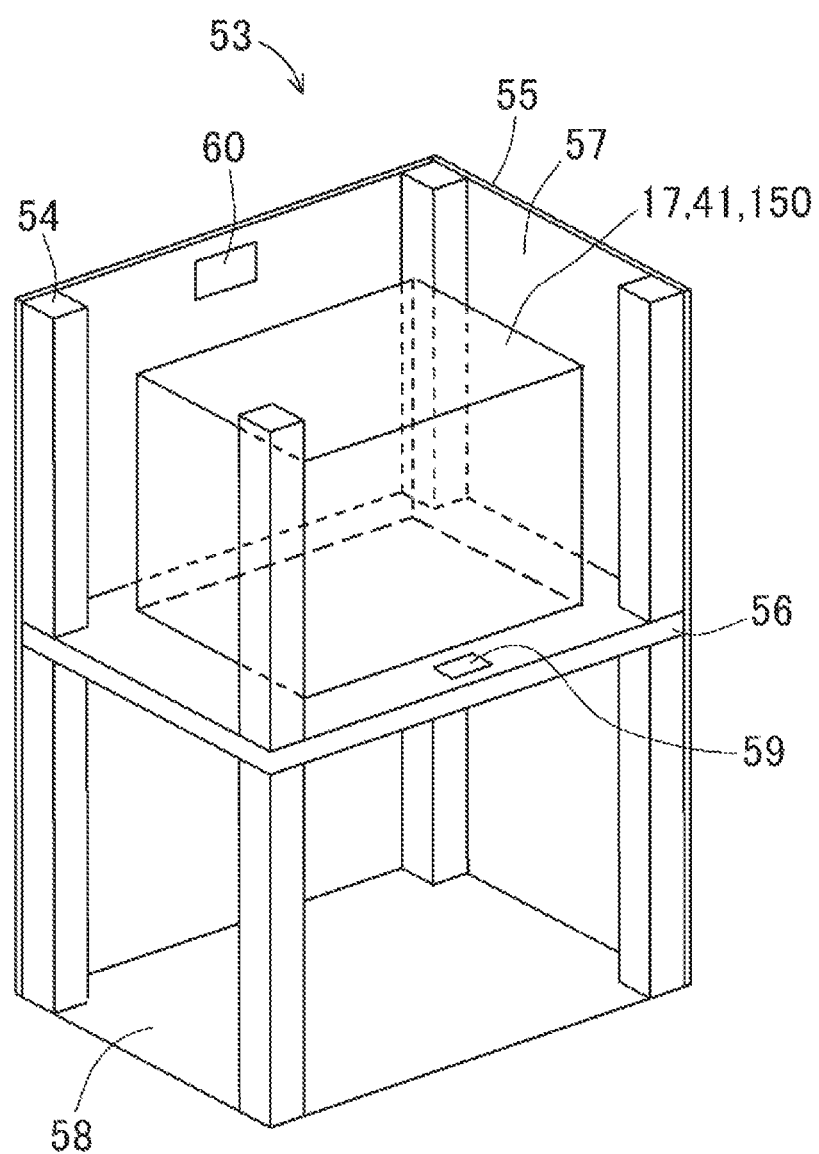
FIG. 10 is an exploded perspective view schematically showing an example of a fuel cell apparatus according to the present embodiment.

FIG. 10 is an exploded perspective view schematically showing a fuel cell apparatus 53 configured so that any one of the fuel cell modules 17, 41, and 150 and auxiliaries for operating the fuel cell module (17, 41, 150) are housed in an exterior case. In FIG. 10, part of the construction is omitted.

In the fuel cell apparatus 53 shown in FIG. 10, the interior of the exterior case composed of a plurality (four in this embodiment) of supports 54 and exterior plates 55 is divided into an upper space and a lower space by a partition plate 56, the upper space defining a module housing chamber 57 for receiving therein the above-described fuel cell module (17, 41, 150), the lower space defining an auxiliary housing chamber 58 for housing therein auxiliaries for operating the fuel cell module (17, 41, 150). The auxiliaries housed in the auxiliary housing chamber 58 are not shown in the drawing.

Moreover, the partition plate 56 is provided with an air passage port 59 for allowing air present in the auxiliary housing chamber 58 to flow toward the module housing chamber 57, the air passage port 59 being provided so as to pass through the partition plate 56 in the thickness direction, and also, part of the exterior plate 55 surrounding the module housing chamber 57 (that is, a part of the exterior plate 55 which constitutes one of the sides thereof in plan configuration), is provided with an air outlet 60 for ejecting air present in the module housing chamber 57 to the outside, the air outlet 60 being provided so as to pass through an upper location of a part of the exterior plate 55 in the thickness direction.

In such a fuel cell apparatus 53, any one of the above-described fuel cell modules 17, 41, and 150 is housed in the exterior case, and hence the fuel cell apparatus 53 which achieves an improvement in power generation efficiency can be realized.

Although the invention has been described in detail, it is understood that the invention is not limited to the embodiments as described heretofore, and various changes, modifications, and improvements are possible without departing from the scope of the invention. For example, although the fuel cell module 41, 150 according to the above-described embodiment has been illustrated as comprising the cell stack device constructed by disposing a single reformer 45 above four cell stacks 2, the cell stack device may be constructed by, for example, disposing a single reformer 45 above two or three cell stacks 2, or by disposing a single reformer 45 above five or more cell stacks 2. In this case, the form of the reformer 45 may be suitably changed on an as needed basis.

Moreover, although in the embodiments as described heretofore, the arrangement wherein two cell stacks 2 are placed on a single manifold 4 has been illustrated, a single cell stack 2 may be placed on a single manifold 4, or three or more cell stacks 2 may be placed on a single manifold 4.

In addition, although the embodiment using the fuel cell 3 of so-called longitudinal stripe configuration has been illustrated, it is possible to use a segmented-in-series fuel cell stack comprising a plurality of power-generating element portions of so-called circumferential stripe configuration disposed on a support.

REFERENCE SIGNS LIST

2: Cell stack
3, 45: Fuel cell
17, 41, 150: Fuel cell module
19: Housing
20: Reformer
24: Oxygen-containing gas supply member
53: Fuel cell apparatus

What is claimed is:
1. A fuel cell module, comprising:
a housing;
a cell stack housed in the housing, the cell stack comprising a plurality of fuel cells which each have a columnar shape and are arranged along a predetermined arrangement direction;

a reformer disposed above the cell stack in the housing, the reformer configured to generate a fuel gas which is supplied to the fuel cells; and an oxygen-containing gas supply section disposed along the predetermined arrangement direction of the fuel cells so as to face the cell stack and the reformer, the oxygen-containing gas supply section having a gas flow channel, the oxygen-containing gas supply section configured to supply, downwardly, an oxygen-containing gas through the gas flow channel to the fuel cells;

the oxygen-containing gas supply section configured so that the gas flow channel has a first region proximate to the cell stack and a second region proximate to the reformer but not proximate to the cell stack, the second region, in its entirety, having a greater flow channel width than the first region in a direction perpendicular to a direction in which an oxygen-containing gas is configured to flow and the predetermined arrangement direction of the fuel cells, wherein a face of the first region opposed to the cell stack is provided with at least three projections protruding toward the cell stack, at least two projections of the at least three projections support a heat insulator interposed between the cell stack and the oxygen-containing gas supply section, and at least one projection of the at least three projections, located between the at least two projections that support the heat insulator, is free of support of the heat insulator.

2. The fuel cell module according to claim 1, wherein a ratio of a flow channel width of the second region to a flow channel width of the first region falls in a range of 1.5 to 10.

3. A fuel cell apparatus, comprising:
the fuel cell module according to claim 1; and
an exterior case which houses therein the fuel cell module.

4. A fuel cell module comprising:
a housing;
a cell stack housed in the housing, the cell stack comprising a plurality of fuel cells that each have a columnar shape and are arranged in an arrangement direction;

a reformer disposed above the cell stack and in the housing, the reformer configured to generate a fuel gas to be supplied to the fuel cells; and an oxygen-containing gas supply section that extends along the arrangement direction and is adjacent to the cell stack and the reformer, the oxygen-containing gas supply section configured to supply an oxygen-containing gas and comprising:

a gas flow channel configured to downwardly supply the oxygen-containing gas to the fuel cells, the gas flow channel comprising:

a first region defined by proximity to the cell stack and a second region defined by proximity to the reformer wherein, in a direction perpendicular to a direction the oxygen-containing gas is configured to flow and to the arrangement direction, a maximum flow channel width of the second region is greater than a maximum flow channel width of the first region, wherein a face of the first region opposed to the cell stack is provided with at least three projections protruding toward the cell stack, at least two projections of the at least three projections support a heat insulator interposed between the cell stack and the oxygen-containing gas supply section, and at least one projection of the at least three projections, located between the at least two projections that support the heat insulator, is free of support of the heat insulator.

5. The fuel cell module according to claim 4, wherein a ratio of a flow channel width of the second region to a flow channel width of the first region falls in a range of 1.5 to 10.

6. A fuel cell apparatus, comprising:
the fuel cell module according to claim 4; and
an exterior case which houses therein the fuel cell module.

* * * * *